United States Patent
Man et al.

(10) Patent No.: US 10,853,934 B2
(45) Date of Patent: Dec. 1, 2020

(54) PATCH-BASED SCENE SEGMENTATION USING NEURAL NETWORKS

(71) Applicant: indus.ai Inc, North York (CA)

(72) Inventors: Lai Him Matthew Man, North York (CA); Mohammad Soltani, North York (CA); Ahmed Aly, North York (CA); Walid Aly, North York (CA)

(73) Assignee: indus.ai Inc, North York (CA)

( * ) Notice: Subject to any disclaimer, the term of this patent is extended or adjusted under 35 U.S.C. 154(b) by 55 days.

(21) Appl. No.: 16/135,948

(22) Filed: Sep. 19, 2018

(65) Prior Publication Data

US 2020/0090316 A1      Mar. 19, 2020

(51) Int. Cl.
| | |
|---|---|
| *G06T 7/00* | (2017.01) |
| *G06T 7/11* | (2017.01) |
| *G06T 7/187* | (2017.01) |
| *G06T 3/40* | (2006.01) |
| *G06N 3/08* | (2006.01) |

(52) U.S. Cl.
CPC ............... *G06T 7/001* (2013.01); *G06N 3/08* (2013.01); *G06T 3/40* (2013.01); *G06T 7/11* (2017.01); *G06T 7/187* (2017.01); *G06T 2207/30124* (2013.01); *G06T 2207/30132* (2013.01); *G06T 2207/30136* (2013.01); *G06T 2207/30161* (2013.01)

(58) Field of Classification Search
CPC .......... G06K 9/00147; G06K 9/00456; G06K 2209/15; G06K 9/00442; G06K 9/00449; G06K 9/34; G06K 9/346; G06K 9/4652; G06K 9/623; G06K 9/00127; G06K 9/325; G06K 9/342; G06K 9/4671; G06K 9/6232; G06N 3/0454; G06N 5/022; G06N 20/00
See application file for complete search history.

(56) References Cited

U.S. PATENT DOCUMENTS

| | | |
|---|---|---|
| 6,440,067 B1 | 8/2002 | DeLuca et al. |
| 7,200,266 B2 | 4/2007 | Ozer et al. |
| 7,330,566 B2 | 2/2008 | Cutler |
| 7,421,369 B2 | 9/2008 | Clarkson |
| 8,179,440 B2 | 5/2012 | Ran et al. |

(Continued)

FOREIGN PATENT DOCUMENTS

| | | |
|---|---|---|
| EP | 3018626 A1 | 6/2016 |
| EP | 3171297 A1 | 5/2017 |

*Primary Examiner* — Quan M Hua
(74) *Attorney, Agent, or Firm* — Hickman Palermo Becker Bingham LLP; Malgorzata A. Kulczycka

(57) ABSTRACT

A method and a system for patch-based scene segmentation using neural networks are presented. In an embodiment, a method comprises: using one or more computing devices, receiving a digital image comprising test image; using the one or more computing devices, creating, based on the test image, a plurality of grid patches; using the one or more computing devices, receiving a plurality of classifiers that have been trained to identify one or more materials of a plurality of materials; using the one or more computing devices, for each patch of the plurality of grid patches, labelling each pixel of a patch with a label obtained by applying, to the patch, one or more classifiers from the plurality of classifiers; using the one or more computing devices, generating, based on labels assigned to pixels of the plurality of grid patches, a grid of labels for the test image.

14 Claims, 8 Drawing Sheets

(56) References Cited

U.S. PATENT DOCUMENTS

| | | | |
|---|---|---|---|
| 9,278,255 B2 | 3/2016 | Cheng et al. | |
| 9,501,837 B2 | 11/2016 | Frosio et al. | |
| 2007/0122000 A1* | 5/2007 | Venetianer | G06K 9/38 |
| | | | 382/103 |
| 2010/0040285 A1* | 2/2010 | Csurka | G06K 9/00624 |
| | | | 382/170 |
| 2011/0012903 A1 | 1/2011 | Girard | |
| 2011/0069888 A1 | 3/2011 | Lim | |
| 2013/0073387 A1 | 3/2013 | Heath | |
| 2015/0235474 A1 | 8/2015 | Mullins | |
| 2016/0086350 A1 | 3/2016 | Michel | |
| 2017/0200067 A1 | 7/2017 | Zhou et al. | |
| 2017/0206662 A1 | 7/2017 | Wang et al. | |
| 2017/0213112 A1 | 7/2017 | Sachs et al. | |
| 2017/0220887 A1 | 8/2017 | Fathi et al. | |
| 2017/0344832 A1 | 11/2017 | Leung | |
| 2017/0345181 A1 | 11/2017 | Yu | |
| 2017/0351417 A1 | 12/2017 | Manico | |
| 2017/0351910 A1 | 12/2017 | Elwazer | |
| 2017/0372216 A1 | 12/2017 | Awiszus | |
| 2018/0033276 A1 | 2/2018 | Whelan | |
| 2019/0220657 A1 | 7/2019 | Yabuki | |
| 2020/0089942 A1 | 3/2020 | Man | |
| 2020/0121987 A1 | 4/2020 | Loh | |
| 2020/0160046 A1 | 5/2020 | Andreou | |
| 2020/0210692 A1 | 7/2020 | Asayama | |

* cited by examiner

PATCH-BASED SCENE SEGMENTATION USING NEURAL NETWORKS

TECHNICAL FIELD

One technical field of the disclosure is methods to monitor and track persons, physical assets, and deliveries of parts and materials in industrial sites. Another technical field is computer-implemented machine vision. Yet another technical field artificial intelligence-based processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Monitoring the arrival and use at construction sites of raw materials, such as lumber, roofing, windows and doors, is a key task in efficient operation of the sites to result in on-time completion of a project. To assist managers and supervisors in monitoring construction sites, some sites employ digital video cameras that are configured to collect videos and images from the sites. Videos and images may support security efforts or management practices such as what materials are moving into the site, levels of consumption of materials and related issues. However, since the cameras usually collect vast amounts of videos and images, reviewing the collected data is time consuming and cumbersome.

Some construction sites rely on computerized systems for security or management tasks. The systems may include a computer server that communicates with many different devices via communications networks. However, if the devices are heterogeneous, then managing the devices is difficult because the devices may collect data at different frame rates, with different time delays, and at different image resolutions. Furthermore, processing the collected data may require specialized and highly trained human resources. Therefore, due to the complexity and non-standardized nature of the collected data, the computerized systems deployed at construction sites are often inadequate and ineffective. There is a need for improvements in monitoring the arrival and consumption of materials at sites and for improvements in the manner in which a large volume of video data is processed.

SUMMARY

The appended claims may serve as a summary of the invention.

DESCRIPTION OF EXAMPLE EMBODIMENTS

Figure 1:
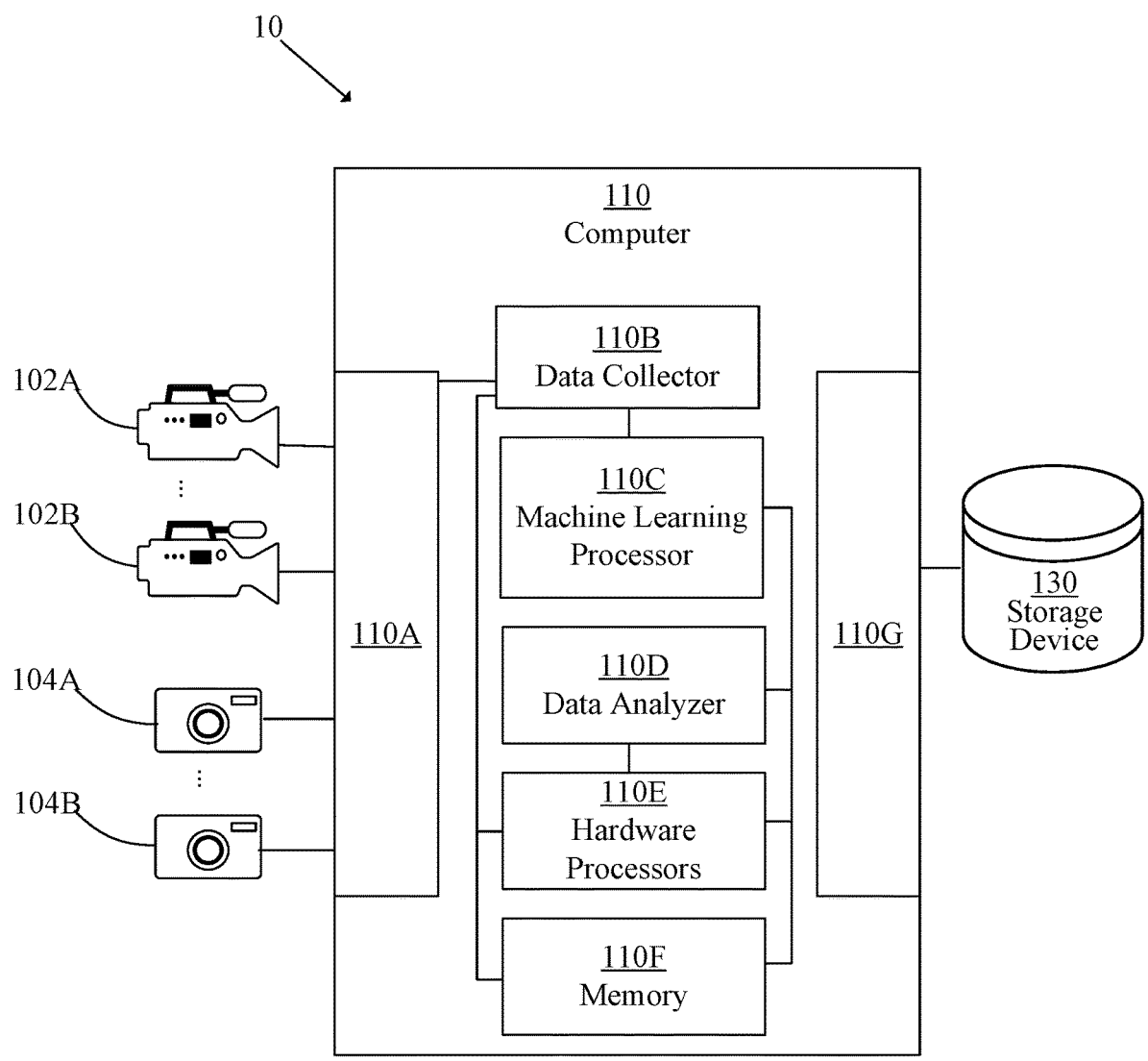
FIG. 1 illustrates an example computer system in which the techniques described may be practiced, according to some embodiments.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. OVERVIEW
2. EXAMPLE SYSTEM ARCHITECTURE
3. NEURAL NETWORK CLASSIFIERS
4. PATCH-BASED SCENE SEGMENTATION USING NEURAL NETWORKS
5. GENERATING SAMPLE IMAGES DEPICTING MATERIALS
6. GENERATING A GRID OF MULTI-SCALE PATCHES FROM A MATERIAL SAMPLE IMAGE
7. GENERATING A GRID OF PATCHES FROM A TEST IMAGE
8. GENERATING A SEGMENTATION MASK
9. IMPROVEMENTS PROVIDED BY CERTAIN EMBODIMENTS
10. IMPLEMENTATION EXAMPLE—HARDWARE OVERVIEW
11. EXTENSIONS AND ALTERNATIVES

1. OVERVIEW

In an embodiment, an approach for patch-based scene segmentation using neural networks for monitoring activities occurring in industrial sites is presented. The approach may be implemented in one or more components that are configured to perform the state-of-the-art machine learning, statistical analysis, computer modeling, operations researching, system designing, and construction domain analyzing. The components may be implemented in a distributed system referred to as a decision support system.

In an embodiment, a decision support system receives input data collected by data collection devices. Examples of data collection devices include video cameras, and other types of digital data collectors. The devices may be deployed in various locations of an industrial site and may be configured to collect data and transmit the collected data to one or more processing computers for performing a patch-based scene segmentation. The collected data may be transmitted to the processing computers via power cables and/or via communications networks.

Processing computers configured to perform a patch-based scene segmentation may include any type of computing devices. Examples of processing computers may include mobile devices, personal computers, standalone workstations, laptops, and server computers. The processing computers may communicate with each other via any type of communications network, including Wi-Fi-based networks, Internet-based networks, local-area networks (LANs), wide area network (WANs), and the like.

In an embodiment, a processing computer is a mobile device and is configured to perform a patch-based scene segmentation of digital images. The mobile device may be, for example, a tablet installed on a trailer parked in an industrial site. The mobile device may process collected data itself, and/or may transmit some of the collected data to, for example, a cloud-based computing system. The mobile device may use the cloud-based computing system to, for example, perform complex computations and CPU-intensive image processing.

Upon receiving input data from data collection devices, a processing computer processes the data to generate output data. The processing may be performed using a machine learning approach, computer modeling, statistical analysis, computer modeling, and other types of data processing. The output data may include associations between patches identified in digital images and labels assigned to the patches.

In an embodiment, an approach for patch-based scene segmentation uses a Convolutional Neural Network ("CNN"). In machine learning, a CNN is a deep, feed-forward artificial neural network that is most commonly applied to analyze digital images. A typical CNN uses a variation of multilayer perceptrons that usually require a minimal amount of preprocessing. Usually, the CNN uses relatively little preprocessing compared to the processing performed by other image classification algorithms because the CNN learns the filters for the images, while the traditional algorithms require a hand-processing of the images. A CNN may be configured with two components: a hidden layer/feature extraction component and a classification component. The hidden layer/feature extraction component is used to perform a series of convolutions and pooling operations during which the features depicted in a digital image are detected. The classification component serves as a classifier on a top of the extracted features. The classifier may be used to assign a probability indicating a likelihood that the object depicted in the image is indeed what the algorithm predicts the object is.

In an embodiment, a process of segmenting a digital image into patches is fully automated. The process may be initialized by obtaining one or more image samples of various materials that might be depicted in digital images of industrial sites and creating one or more grids of patches for each material sample image. A grid for a given material sample usually includes patches that depict the given material but have varied image sizes.

The process may also include using the patches to train multi-class CNN-based classifiers to recognize various materials that might be depicted in digital images of industrial sites.

Upon receiving a digital image captures by a camera installed in an industrial site, the received digital image is automatically divided into a grid of patches. Then, a CNN-based classifier is applied to each patch of the grid to determine the materials that are most likely depicted in the corresponding patches.

Once the materials that are most likely depicted in the corresponding patches are determined, the labels, also called classification labels and indicating the materials, are mapped onto the patches of the digital image. Then, for each patch, a label determined for the patch is associated with each pixel of the patch. As a result, the digital image is processed into patches wherein the pixels of the patches are labelled with a corresponding classification label indicating a material that is most likely depicted in the patch.

In an embodiment, output generated by the patch-based scene segmentation approach is used to monitor activities occurring in industrial sites. This may include identifying and counting workers present on the sites at certain times, counting workers per trade, and monitoring construction materials, equipment and vehicles. The output generated by the patch-based scene segmentation approach may be also used by systems configured to provide measures for improving safety, efficiency and accountability in the industrial sites, and improving efficiency in using the machines, materials, and other resources. This may include monitoring the persons as they enter and leave the industrial sites, verifying the workers' timesheets, workers' overtime entries, and monitoring efficiency in the use of machines, materials and other physical resources.

2. EXAMPLE SYSTEM ARCHITECTURE

FIG. 1 illustrates an example computer system in which the techniques described may be practiced, according to some embodiments.

In one embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 depicts a plurality of data input devices 102A-104B, a processing computer 110, and a data storage device 130. Data input devices 102A-104B may include one or more video cameras 102A, 102B, and one or more digital cameras 104A, 104B.

Data input devices 102A-104B may be configured to collect information about persons, objects and activities present or occurring in an industrial site. For example, video cameras 102A, 102B, may be configured or programmed to record video segments depicting persons and trucks present in a construction site, store the recorded video segments, and transmit the recorded video segments to computer 110. Similarly, digital cameras 104A, 104B may be configured or programmed to capture digital images depicting the persons and the trucks, store the captured images, and transmit the captured images to computer 110.

Computer 110 is a processing computer configured to receive data collected by cameras, analyze and process the received data, and generate output. For example, upon receiving a digital image captured by a digital camera 104A installed in an industrial site, computer 110 may process the received image, and generate output. The output may include a mapping between patches identified in the digital image and labels of materials that are most likely depicted in the corresponding patches. Alternatively, the generated output may include a mapping between image pixels of the patches identified in the digital image and labels of materials that are most likely depicted in the corresponding patches.

Generated mappings may be transmitted to a monitoring system (not depicted in FIG. 1) to generate activity records, activity metrics, and activity-based alerts specific to the industrial site. The monitoring system may use the output generated by computer 110 to manage an industrial site. This may include generating messages, warnings and alarms indicating safety violations, corruption, and inefficiencies occurring on the industrial site.

Computer 110 may be a standalone device or part of a public or a private cloud system. Computer 110 may be, for example, a privately-owned computing device that is operated on behalf of the management of an industrial site. Computer 110 may be implemented within a local network managed by the industrial site or may be implemented as an independent device outside the local network of the industrial site. Access to computer 110 may be secured using credentials. The credentials may be provided to a management team or a system administrator.

In an embodiment, computer 110 includes an input interface 110A that is configured to receive data from data input devices, such as video cameras 102A, 102B, and digital cameras 104A, 104B. Computer 110 may also include an output interface 110G for outputting and storing data. For example, computer 110 may use output interface 110G to output a mapping between patches identified in a digital image capturing an industrial site and labels of materials that are most likely depicted in the patches. The mapping may be stored in storage device 130.

Computer 110 may include a data collector 110B that is configured to receive data via input interface 110A. Data collector 110B may be also configured to translate the received data from one data formal to another. For example, data collector 110B may be used to convert images from a JPEG format to a TIFF format.

Computer 110 may further include a machine learning processor 110C configured to execute a machine learning program, algorithm, or process. The machine learning process may be executed using one or more neural networks and using data provided by any of input devices 102A-104B. The machine learning process may be executed to enhance and improve the content of the received data. For example, machine learning processor 110C may be configured to process a digital video stream, provided by a video camera installed in an industrial site, to perform a patch-based segmentation of the scene depicted in the video stream.

Computer 110 may also include a data analyzer 110D. Data analyzer 110 may be configured to execute a computer modeling, statistical analysis, computer modeling, and image processing of the received image data.

Computer 110 may also include one or more hardware processors configured to execute instructions stored in memory 110F, and to cause instantiating data collector 110B, machine learning processor 110C, and data analyzer 110D.

Computer 110 may be communicatively connected to storage device 130. The communications between computer 110 and storage device 130 may be facilitated using any type of a wired or wireless connection, including, but not limited to, a power cable, a Local Area Network (LAN), a Wide Area Network (WAN), the Internet, and a company network.

Storage device 130 may be configured to store data used and generated by computer 110. Storage device 130 may be implemented in one or more hard disk drives, memories, or any other electronic digital data recording devices configured to store data. Storage device 130 may include an individual device (as depicted in FIG. 1), or a plurality of storage devices located in various locations (not depicted in FIG. 1). Storage device 120 may be implemented in one or more nodes of one or more data warehouses, and may include one or more databases such as relational databases, hybrid databases, columnar databases, and the like.

Storage device 130 may be implemented as a device separate from computer 110, as depicted in FIG. 1. Alternatively, storage device 130 may be implemented as part of computer 110 or may be implemented within the same computer network as server computer 110.

3. NEURAL NETWORK CLASSIFIERS

In an embodiment, an approach for segmenting a digital image into patches labeled with names of materials most likely depicted in the patches uses pre-trained classifiers. At its core, the approach uses a CNN-based classifier determined by training a CNN with training sample images depicting materials that may be present in an industrial site.

A classifier in the context of machine learning is an algorithm that implements classification of data such as image data, object data, and the like. A classifier algorithm may be a mathematical function that is implemented by a classification algorithm that maps input data to a category. A CNN-based classifier may be a CNN classification algorithm that is configured to assign a probability that a particular patch depicting a portion of an industrial scene matches a sample patch depicting a particular industrial material such as concrete, wood, or glass.

Figure 2:
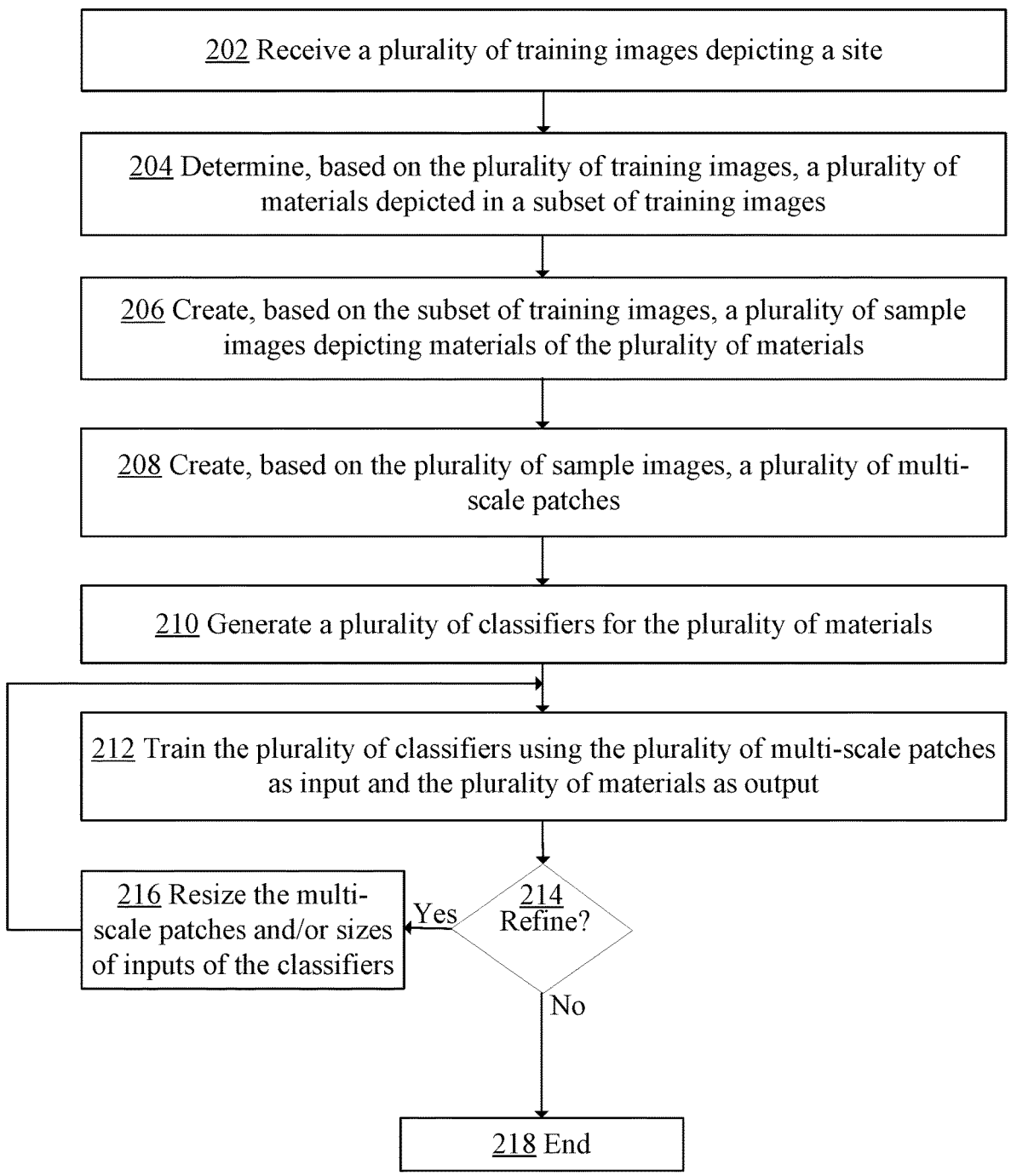
FIG. 2 depicts a flowchart for an example classifier generation process.

FIG. 2 depicts a flowchart for an example classifier generation process. In an embodiment, a machine learning processor is configured with the functionalities of a neural network and is used to generate a plurality of classifiers. An example of the machine learning processors configured to generate classifiers is machine learning processors 110C depicted in FIG. 1.

In step 202, a machine learning processor receives a plurality of training images that depict materials that may be used in an industrial site. Typically, the training images are digital images depicting industrial materials such concrete, glass, metal steel, wood, and the like. Examples of industrial sites include construction sites, manufacturing sites, building sites, and the like.

In step 204, the machine learning processor determines a plurality of materials based on the plurality of training images. This step may be performed automatically, manually, or both, and the process may be performed for each image of the plurality of training images.

The constructions materials may include any of: concrete, steel, rebar, plastic, wood, asphalt, porcelain, brick, composite, plaster, gypsum, cement, ceramic, carpet, paint, stucco, mortar, stone, urbanite, wire ropes, wire cables, bamboo, sheath panels, plex panels, plywood, wallpaper, laminate, or veneer. The construction materials may be used to build or install buildings, framings, mezzanine floors, purlins, insulations, coating, house wraps, doors, electrical systems, plumbing systems, surface finishing, flooring, wall coverings, heating systems, ventilation systems, air conditioning systems, utility systems, storage systems, roofs, windows, stairs, hangars, storage facilities, warehouse facilities, or garages.

In an embodiment, the images are preprocessed automatically. For example, the images may be automatically scanned, and a dominant color, a dominant pattern, or a dominant texture for each image are determined. Based on the dominant color, pattern or texture determined for the image, the machine learning process may determine whether the image depicts a construction material. If the image does not depict a construction material, then the image is discarded. However, if the image depicts a construction material, then a type of construction material depicted in the image is determined, and the image is labelled with a name of the material depicted in the image. The labelled images are included in a subset of training images.

In an embodiment, the training images are processed manually. For example, each training image in the plurality of images is visually inspected to determine whether the image depicts a construction material. If the image depicts a construction material, then the image is labelled with a name of the constructions material. The labelled images are included in a subset of training images. However, if the image does not depict a construction material, then the image is discarded.

In an embodiment, the images are processed partially automatically and partially manually. For example, an image may be automatically scanned, and a dominant color or texture may be automatically determined for the image. Based on the dominant color or texture, the machine learning process may assign an initial color to the image and label the image with a name of the initially assigned color. Then, the assignment may be visually inspected by a trained technician, and based on the inspection, the technician either accepts the initially assigned label or revises the label. The labelled images are included in a subset of training images.

In step 206, the machine learning process, creates, based on the subset of training images, a plurality of sample images. Each sample image may depict one material of the plurality of materials.

This step may include performing a per-pixel analysis of the images that have been labelled with the names of construction materials. The per-pixel analysis of an image may include determining at least one region in the image that includes pixel that have rather similar pixel values and that depicts a construction material. This may also include determining boundaries of such a region, and cropping/resizing the image so that it depicts as much of the region as possible. The cropped and resized image depicting a particular construction material is referred to herein as a sample image of the particular construction material. Therefore, if a particular sample image is labelled with a label, for example, concrete, then the particular sample image depicts concrete.

In step 208, the machine learning process creates, based on the plurality of sample images, a plurality of multi-scale patches for the plurality of materials. The process is repeated for each sample image of the plurality of sample images, and each patch created for a sample image has a different image resolution than a resolution of another patch created for the same sample image.

Multi-scale patches created for a sample image are usually square images, although the patches may be also non-square rectangles.

In an embodiment, a plurality of multi-scale patches created for a particular sample image includes a plurality of patches, each patch having a resolution different than the resolutions of other patches in the plurality created for the sample image. For example, for a particular sample image, a plurality of multi-scale patches may include a patch that has 128×128 pixel resolution, a patch that has a 256×256 pixel resolution, a patch that has a 512×512 pixel resolution, and so forth. Examples of patches created for a sample image are described in FIG. 5.

In step 210, the machine learning process, designs a plurality of classifiers for the plurality of materials. This may include accessing a library of classifiers that have been already defined for default materials, extracting, from the library, a plurality of classifiers that have been defined for default materials, and returning the plurality of classifiers that have been defined for the default materials. The default classifiers may provide default definitions of a plurality of default materials in terms of colors, patterns, and textures for the default construction materials.

In step 212, the machine learning process trains the plurality of classifiers using the plurality of multi-scale patches as input to a neural network and using the plurality of materials as output to the neural network.

This step allows refining the plurality of default classifiers and customizing the default classifiers to the materials included in the plurality of materials that is specific to the construction site. For example, if the construction site uses three different types of concrete slabs, but the plurality of default classifiers retrieved from the library includes only one classifier for a default concrete slab, then by performing step 212, the machine learning process generates three separate classifiers, and each classifier will be customized to one of the concrete slabs used in the construction site. A particular classifier for a particular concrete slab may be trained using all multi-scale patches that have been identified as depicting the particular concrete slab.

In step 214, the machine learning process tests whether the classifiers, of the plurality of classifiers, trained using the process described in step 212, are acceptable and adequate for distinguishing the plurality of materials determined based on the plurality of training images. This may include determining whether the machine learning process determined at least one classifier for each material of the plurality of materials, and whether the classifiers are unique and adequate.

If it is determined that one or more classifiers, of the plurality of classifiers, need to be refined, then the machine learning process proceeds to executing step 216, in which multi-scale patches used to generate the one or more classifiers are resized, and the resized multi-scale patches are used to refine the plurality of classifiers in step 212. This process may be repeated until all the plurality of classifiers is acceptable and adequate for distinguishing the materials determined based on the training images.

If, in step 214, the machine learning process determines that all classifiers in the plurality of classifiers are adequate to unequivocally distinguish each material in the plurality of materials identified for the construction site from other materials in the plurality of the materials, then, in step 218, the machine learning process finishes the classifier training process.

In an embodiment, a plurality of classifiers includes a plurality of CNN classifiers that are trained to recognize industrial/construction materials depicted in test images. The CNN classifiers may accept as input the test images that have various sizes and properties. For example, the CNN classifiers may accept square test images, rectangular test images, JPEG test images, TIFF images, high resolution test images, low resolution test images, and the like.

4. PATCH-BASED SCENE SEGMENTATION USING NEURAL NETWORKS

Once one or more CNN-based classifiers are trained, the classifiers may be deployed and used to perform a patch-based scene segmentation of digital images depicting an industrial site. The digital images may be received from digital cameras installed on the industrial site. To distinguish the digital images depicting the industrial site from training images used to generate CNN-based classifiers, the digital images are referred to herein as test images.

In an embodiment, each test image is divided into a grid of patches. Each patch of the grid is processed using one or more trained CNN-based classifiers to obtain a label of the material that is most likely depicted in the patch. Once a label is determined for a patch, the label is associated with each pixel of the patch. The result may include mappings organized by the patches, wherein a mapping for a particular patch includes labels mapped onto pixels of the patch.

Figure 3:
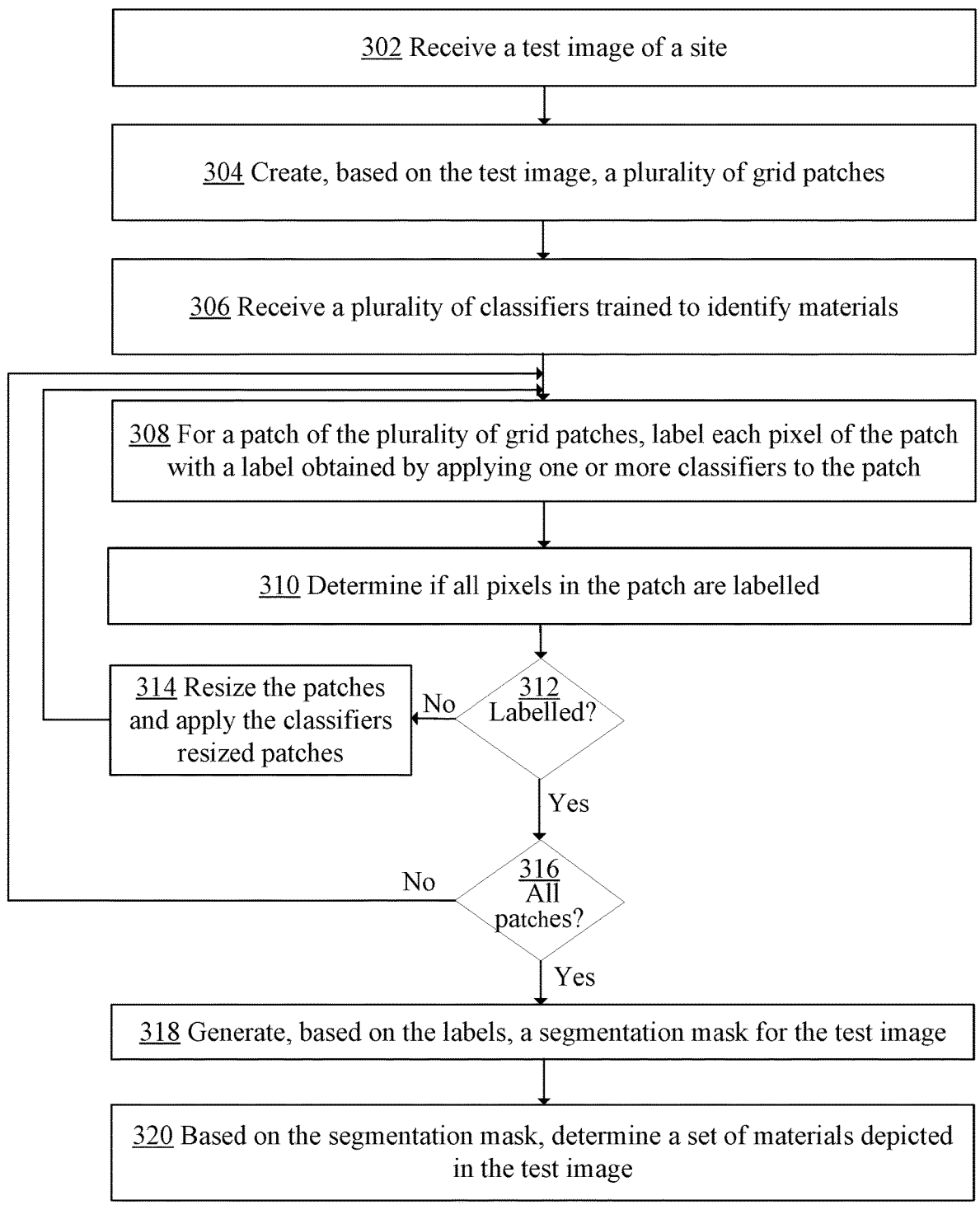
FIG. 3 depicts a flowchart for a patch-based scene segmentation process using neural networks.

FIG. 3 depicts a flowchart for a patch-based scene segmentation process using neural networks. The process described in FIG. 3 may be performed by any type of processor included in any type of processing computer 110 (shown in FIG. 1).

In step 302, a processor receives a test image that depicts a scene from an industrial site. The test image may be an indoor image or an outdoor image. For example, the test image may depict a building constructed on the construction site, a scaffolding erected in the site, an inside view of a constructed building, or an outside view of the constructed building.

Typically, test images are digital images captured by one or more digital cameras, or digital video frames captured by one or more video cameras. The test images may be, for example, a stream of digital video frames captured by a video camera installed on the industrial site to record the stream of frames depicting activities taking place on the site. Examples of industrial sites include construction sites, manufacturing sites, building sites, and the like.

In step 304, the processor creates, based on the test image, a plurality of grid patches. For example, the processor may divide the test image into a uniform grid of rectangular or square patches. Typically, the patches do not overlap each other in the grid.

In step 306, the processor receives a plurality of classifiers trained to identify materials. The plurality of classifiers may include CNN-based classifiers described in FIG. 2.

In step 308, for a patch of the plurality of grid patches, the processor identifies a label that indicates material that most likely is depicted in the patch. This may be accomplished by processing a patch of the grid using the trained CNN-based classifiers and determining which CNN-based classifier returns the highest probability that the material corresponding to the CNN-based classifier is indeed depicted in the patch.

Determining whether a label may be assigned to pixels of a patch may include applying one or more classifiers to the pixels of the patch to determine one or more individual labels, and then applying, for example, a majority voting algorithm or other algorithm, to determine a dominant label for the entire patch, and thus for all pixels of the patch.

It may happen, however, that the processor is unable to assign a label to a patch. For example, a patch may depict something that does not correspond to any of the materials that the CNN-based classifiers are trained to recognize, and therefore, the processor may be unable to determine a label for the patch at this time. According to another example, a patch may depict several construction materials and none of the CNN-based classifiers may determine a dominant material that is depicted in the patch; therefore, the processor may be unable to determine a label for the patch. Hence, it is possible that the processor cannot assign a label to a patch at this time.

However, if for a particular patch a label of material is identified, then each pixel of the patch is labelled with the table. For example, is a patch is a 256×256 square image, then a 256×256 mask will be generated where each pixel of the mask is labelled with the identified label.

In step 310, the processor determines if all pixels in the patch have been labelled with a corresponding label of material. If all pixels have been labelled, then the processor proceeds to step 316. Otherwise, the processor proceeds to step 314, in which the processor resizes the patches to a different grid of patches and proceeds to step 308 to repeat the classification of the patches with labels of materials.

In step 314, the processor resized the patches to a different grid of patches. This may be performed because by applying the classifiers, the processor was unable to label all pixels of the patch. More specifically, this may happen when a pixel-based-size of the patch does not match a pixel-based-size of the classifier of the plurality of classifiers.

In an embodiment, a patch may be resized by either downsizing or upsizing the patch. If it assumed that the classifiers use square sample images, then the patch obtained from the test image may have to be resized to a square image.

In an embodiment, a patch is not resized, but other resolution material sample images of classifiers are used. For example, the processor may request that higher resolution material sample images are used to classify the patch.

In step 316, the processor tests whether all patches of the grid of patches have been successfully processed and have labels assigned to the pixels of the patches. If that is true, then the processor proceeds to performing step 318; otherwise, the processor proceeds to step 308, in which the processor repeats the classification of the patches with labels of materials.

Step 318 is reached when the processor determines that patches of the grid of patches have assigned labels of materials, and more specifically, that, for each patch of the grid of patches, all pixels of the patch have assigned a corresponding label of a corresponding material. In this step, the processor combines the pixel-label mappings determined for individual patches into one combined mapping. From the combined mapping, the processor generates a segmentation mask for the test image. The mask may include a two-dimensional grid of labels mapped onto the pixels of the test image.

In some situations, however, generating a segmentation mask for the entire test image is not possible. In such situations, the processor may determine whether to proceed with the mappings even if a segmentation mask for the entire test image is missing some mappings for some regions of the test image. If the processor may determine that the incomplete segmentation mask is acceptable, then the processor proceeds to step 320; otherwise, the processor may generate an error message indicating the difficulties in generating a complete segmentation mask and transmit the error message to a system administrator or a user.

In step 320, the processor determines, based on the segmentation mask, a set of materials depicted in the test image. This may include determining counts of different labels included in the segmentation mask. For example, if the segmentation mask is a 256×256 mask, and it includes 50 labels of concrete material, 25 labels of steel material, 20 labels of wood material, and so forth, then the processor may determine that the corresponding test image depicts primarily concrete, steel, and wood.

Information derived in step 320 may be provided to a decision support system configured to monitor an industrial site. For example, based on a set of materials determined for the test image, the decision support system may determine work status of activities taking place on the industrial site for which the test image was captured.

5. GENERATING SAMPLE IMAGES DEPICTING MATERIALS

Figure 4:
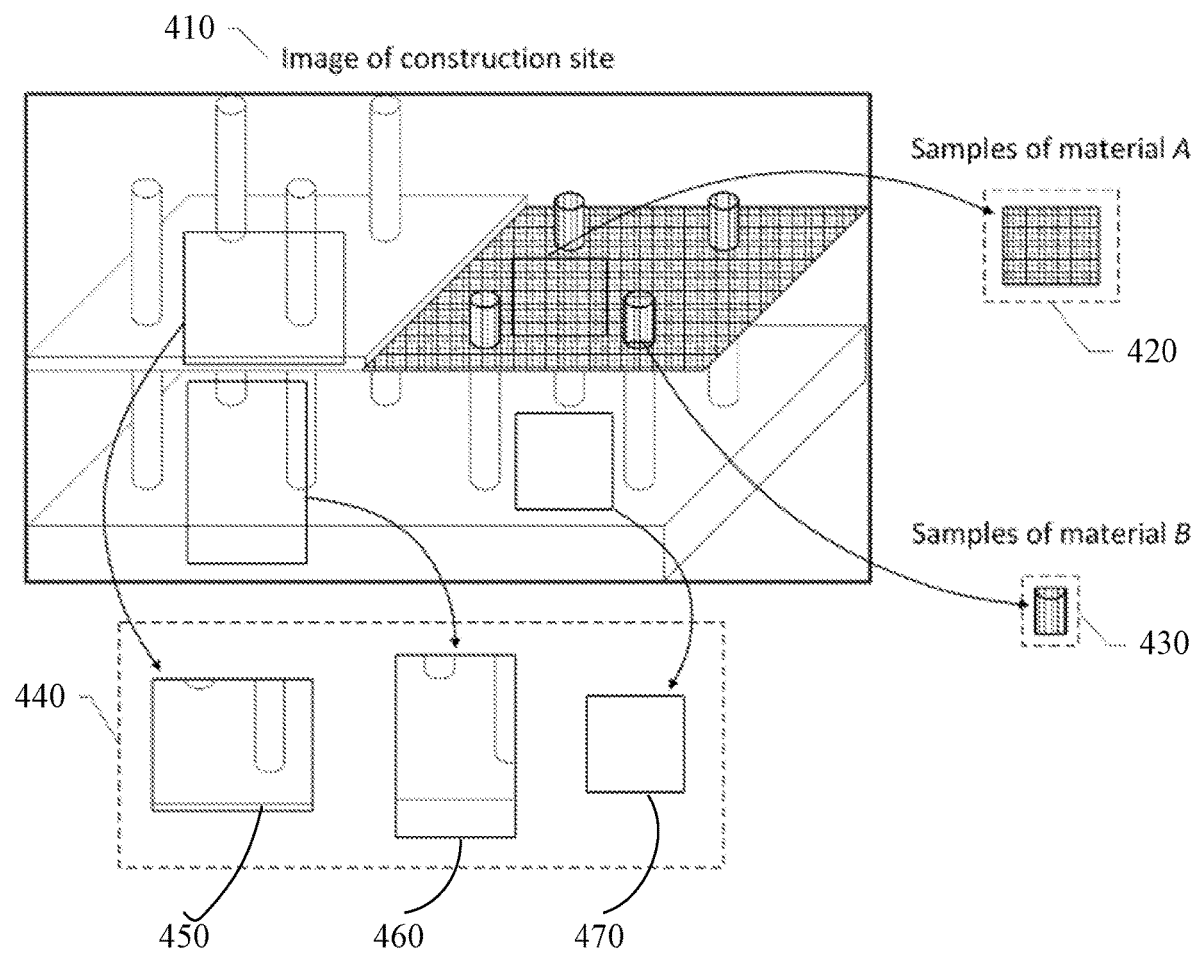
FIG. 4 depicts an example diagram for generating sample images depicting materials.

FIG. 4 depicts an example diagram for generating sample images depicting materials. FIG. 4 is an image 410 of a construction site and depicts a building being under construction. Image 410 shows two floors and columns or pillars erected from the floors.

From image 410, sample images of various materials may be derived. Some of the samples may depict individual materials. For example, a processor may identify, from image 410, a sample 420 of material "A" that depicts concrete used in concrete slabs laid on floors. The processor may also identify, from image 410, a sample 430 of material "B" that depicts wood used in pillars erected from the floors. Each of samples 420-430 may be represented as grid of multi-scale patches, as described in FIG. 5.

Other samples may depict combinations of materials. For example, samples 450 and 460 depict some combinations of concrete material and wood material.

Other samples may depict materials that are unknown to a classifier. For example, a sample 470 depicts material that is unknown to the classifying system used by a particular CNN.

6. GENERATING A GRID OF MULTI-SCALE PATCHES FROM A MATERIAL SAMPLE IMAGE

Figure 5:
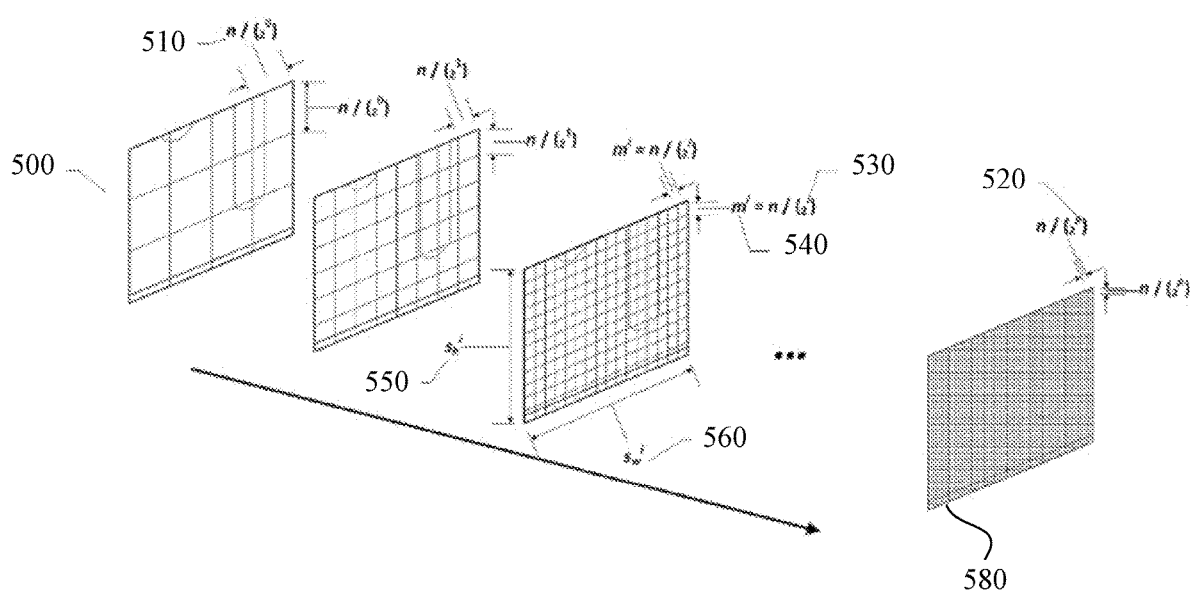
FIG. 5 depicts an example diagram for generating a grid of multiscale patches from a material sample image.

FIG. 5 depicts an example diagram for generating a grid of multiscale patches from a material sample image. Generally, a grid of multiscale patches for a material sample image may include one or more images, each of which has a resolution that is different than a resolution of another image in the grid. The different resolutions in this context may include different size resolutions, different sizes, different scales, and the like. In the depicted example, a grid of multiscale patches includes 4 images, a first of which is a sample image 500 a last of which is a sample image 580. While the depicted grid includes 4 images, other grids may include fewer or additional images.

As depicted in FIG. 5, a material sample image 500 is processed by applying an automated patch generation algorithm, like the process described in FIG. 2. A minimum size of the patches may be defined by a user. In the depicted example, the minimum size of the patches is denoted in FIG. 5 using an element 510. The user may also define a number of steps for increasing the size of the patches in the grid of patches. grid.

As shown in FIG. 5, it may be assumed that the size of each patch is m'×m', as denoted in FIG. 5 using an element 540, and that there are p steps, as denoted in FIG. 5 using an element 520, starting from zero. When the size of the sample is h×w, then the size of the grid at step $i_{th}$ (530) along the vertical and horizontal axes are called $s^i$h (550, 560), respectively, which can be calculated using equations (1) and (2), shown below:

$$m^i = \frac{n}{2^i} \quad (1)$$

$$s^i_h = \text{integer}\left(\frac{m^i}{h}\right) \quad (2)$$

$$s^i_w = \text{integer}\left(\frac{m^i}{w}\right) \quad (3)$$

where i is from zero to p.

The reason for keeping the height and width of each patch the same is to avoid any changes into aspect-ratio of the patches.

The architecture of a CNN can be designed differently based on the number of desired materials (classes) and a size of training data. For example, the size of a network for few classes and few thousand samples may be much smaller than a network designed for a larger number of classes with millions of samples. Assuming that the input size of network is q×q, all the patches at different steps are resized to q×q.

In an embodiment, a last step in the offline phase is training of a CNN classifier using the grids of patches.

7. GENERATING A GRID OF PATCHES FROM A TEST IMAGE

Figure 6:
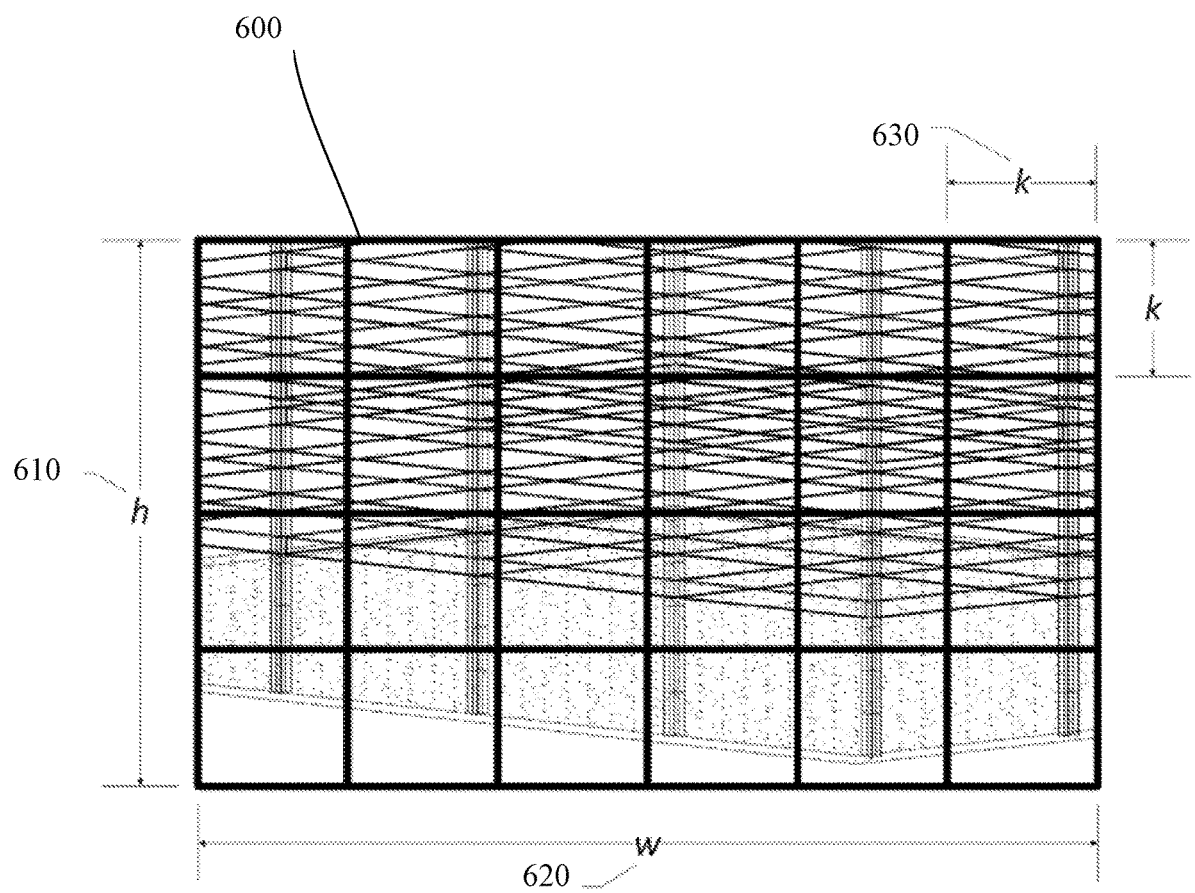
FIG. 6 depicts an example diagram for generating a grid of patches from a test image.

FIG. 6 depicts an example diagram for generating a grid of patches from a test image. Upon receiving example test image 600, a patch-based scene segmentation process for the image starts with dividing image 600 into square patches. A size of the patches may vary. In the example depicted in FIG. 6, image 600 has a height "h" 610 and a width "w" 620. In the example depicted in FIG. 6, a size of the patches is k×k 630. The size of k may be selected by a user; however, the patches may be later automatically resized to q×q. The size of the grid can be calculated using equations (2) and (3) shown above, while this time i is equal to zero and m is equal to k.

If i is set to any value greater than zero, then a majority voting, used to determine a label for a patch of image 600, may be applied for each pixel between different outputs and for different grid sizes.

8. GENERATING A SEGMENTATION MASK

Figure 7:
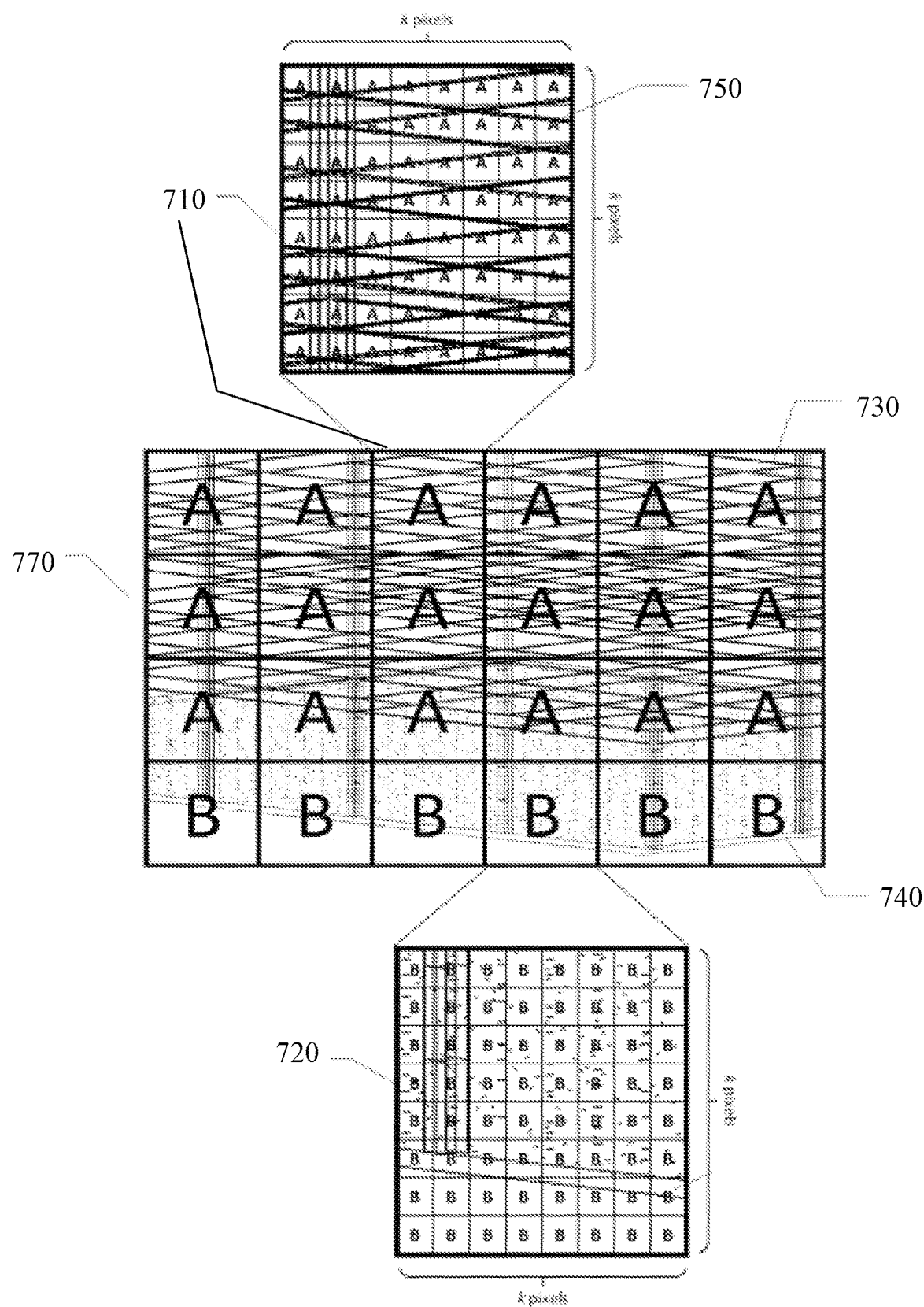
FIG. 7 depicts an example diagram for generating a segmentation mask.

FIG. 7 depicts an example diagram for generating a segmentation mask. In the depicted example, a test image 770 has been divided into a set of patches, and the set of patches comprises patches 710, 720, 730 and 740. An example process of dividing test image 770 into patches is described in FIG. 6.

In an embodiment, each patch of test image 770 is processed by applying one or more classifiers to generate and assign an output label that identifies material that most likely is depicted in the patch. For example, by applying one or more classifiers to patch 710, a label "A" is assigned to each pixel of patch 710; while by applying the one or more classifiers to patch 720, a label "B" is assigned to each pixel of patch 720. The mappings between the pixels of the patches and the labels are stored in associations with the corresponding patches.

Assuming that applying the classifiers to all patches of test image 770 ended with assigning labels to all pixels and all patches, the mappings generated for the patches are combined into a segmentation mask. As explained for FIG. 3, this may not be always the case.

Once test image 770 is divided into patches, labels identified for the patches are stored in associations with pixels of the corresponding patches. In the depicted example, test image 770 was divided into 24 patches (4 rows and 6 columns of patches). A corresponding segmentation mask includes 4 rows and 6 columns: the first three rows include "A" labels, while the last row includes "B" labels. From the segmentation mask, one may infer that the test image depicted two materials: one material labeled using "A" labels, and another material labelled suing "B" labels.

9. IMPROVEMENTS PROVIDED BY CERTAIN EMBODIMENTS

In an embodiment, a patch-based scene segmentation process using neural networks is presented. The patch-based scene segmentation process may be used to generate segmentation masks for test images provided by digital cameras installed in industrial sites. The segmentation masks may be used to identify materials and objects present in the sites, and thus, to determine, for example, the materials that are present and used in the sites.

In an embodiment, segmentation masks are provided to a decision support system to enable many functionalities that have been sought by major construction companies. By providing the segmentation masks to the decision support system, the system may be valuable and marketable to the companies because it may provide mechanisms for improving safety on construction sites, improving efficiency in tracking persons and equipment, improving accountability from subcontractors, and improving accountability to the city and citizens.

10. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
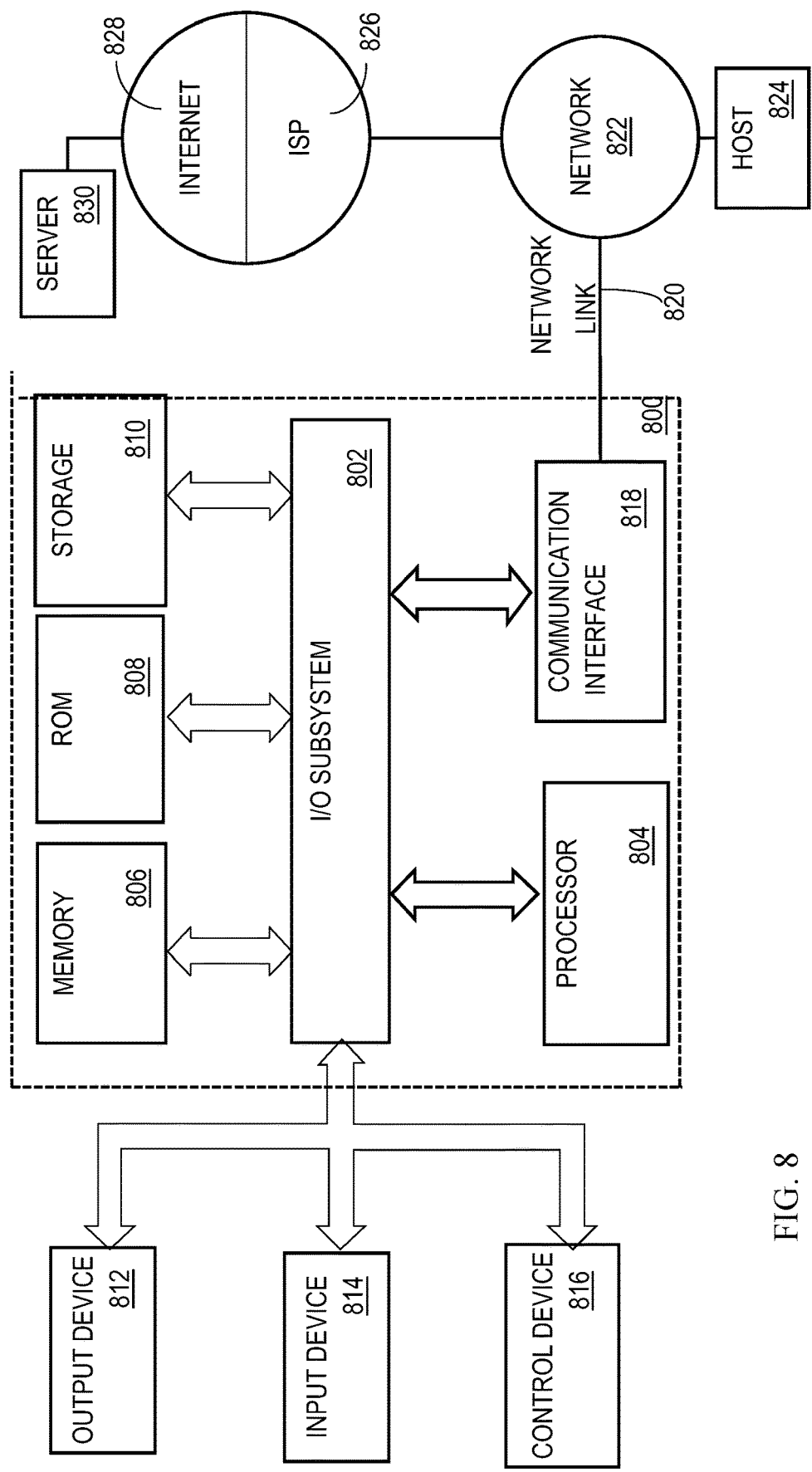
FIG. 8 is a block diagram that illustrates an example computer system with which an embodiment may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, instantiating several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

11. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer-implemented method comprising:
using one or more computing devices, receiving a digital image comprising test image;
using the one or more computing devices, creating, based on the test image, a plurality of grid patches;
using the one or more computing devices, receiving a plurality of classifiers that have been trained to identify one or more materials of a plurality of materials;
for each patch of the plurality of grid patches, before each pixel of the patch, of the plurality of grid patches, is labeled with a label:
determining whether a pixel-based-size of the patch matches a pixel-based-size of a classifier of the plurality of classifiers;
in response to determining that the pixel-based-size of the patch does not match the pixel-based-size of the classifier in the plurality of classifiers, generating a resized patch by either downsizing or upsizing the patch, and replacing the patch with the resized patch in the plurality of grid patches;

applying the classifier or a different classifier, from the plurality of classifiers, to the patch to determine whether labels can be assigned to pixels of the patch;

in response to determining that one or more pixels of the patch do not have assigned labels, repeating resizing of the patch until all pixels of the patch have assigned labels;

using the one or more computing devices, generating, based on labels assigned to pixels of the plurality of grid patches, a grid of labels for the test image;

based on, at least in part, the grid of labels, generating a segmentation mask for the test image;

based on, at least in part, the segmentation mask, determining a set of materials, of the plurality of materials, that is depicted in the test image;

based on, at least in part, the set of materials that has been determined, determining a work status of activities taking place on a site for which the test image was received, the site comprising one or more of a construction site, an industrial site, a warehouse site, a storage site, a commercial site or a residential site.

2. The method of claim 1, further comprising determining whether labels can be assigned to pixels of the resized patch comprises by applying a majority voting algorithm to labels assigned to pixels of the resized patch to determine the labels for all pixels of the resized patch.

3. The method of claim 2, further comprising:

receiving a plurality of training images of the site;

determining, based on the plurality of training images, the plurality of materials that is depicted in the plurality of training images;

creating, based on the plurality of training images, a plurality of sample images, each sample image depicting at least one material of the plurality of materials;

creating, based on the plurality of sample images, a plurality of multi-scale patches for the plurality of materials, each multi-scale patch for a material is created from a sample image of the material from the plurality of materials;

designing, using the one or more computing devices, the plurality of classifiers configured to analyze digital images having different sizes;

training the plurality of classifiers using the plurality of multi-scale patches as input and using the plurality of materials as output.

4. The method of claim 3, wherein a training image, of the plurality of training images, is a rectangular image;

wherein the plurality of training images includes indoor and outdoor images;

wherein the test image, of a plurality of test images, is captured by a camera that is installed at a fixed location;

wherein the plurality of test images is used to determine work progress over time, to determine quality of the plurality of materials that are being installed, and to determine correctness of installations;

wherein a multi-scale patch, of the plurality of multi-scale patches, is a square image;

the plurality of materials comprising two or more of: concrete, steel, rebar, plastic, wood, asphalt, porcelain, brick, composite, plaster, gypsum, cement, ceramic, carpet, paint, stucco, mortar, stone, urbanite, wire ropes, wire cables, bamboo, sheath panels, plex panels, plywood, wallpaper, laminate, or veneer;

wherein the plurality of materials are used to build or install one or more of: buildings, framings, mezzanine floors, purlins, insulations, coating, house wraps, doors, electrical systems, plumbing systems, surface finishing, flooring, wall coverings, heating systems, ventilation systems, air conditioning systems, utility systems, storage systems, roofs, windows, stairs, hangars, storage facilities, warehouse facilities, or garages.

5. The method of claim 4, wherein the plurality of classifiers includes a plurality of convoluted neural network classifiers; wherein the plurality of classifiers comprises classifiers that accept inputs having different pixel-based-sizes.

6. An image segmentation system comprising one or more processors, one or more non-transitory digital storage media coupled to the processors and storing one or more sequences of program instructions which, when executed using the one or more processors, cause the one or more processors to perform:

using one or more computing devices, receiving a digital image comprising test image;

using the one or more computing devices, creating, based on the test image, a plurality of grid patches;

using the one or more computing devices, receiving a plurality of classifiers that have been trained to identify one or more materials of a plurality of materials;

for each patch of the plurality of grid patches, before each pixel of the patch, of the plurality of grid patches, is labeled with a label:

determining whether a pixel-based-size of the patch matches a pixel-based-size of a classifier of the plurality of classifiers;

in response to determining that the pixel-based-size of the patch does not match the pixel-based-size of the classifier in the plurality of classifiers, generating a resized patch by either downsizing or upsizing the patch, and replacing the patch with the resized patch in the plurality of grid patches;

applying the classifier or a different classifier, from the plurality of classifiers, to the patch to determine whether labels can be assigned to pixels of the patch;

in response to determining that one or more pixels of the patch do not have assigned labels, repeating resizing of the patch until all pixels of the patch have assigned labels;

using the one or more computing devices, generating, based on labels assigned to pixels of the plurality of grid patches, a grid of labels for the test image;

based on, at least in part, the grid of labels, generating a segmentation mask for the test image;

based on, at least in part, the segmentation mask, determining a set of materials, of the plurality of materials, that is depicted in the test image;

based on, at least in part, the set of materials that has been determined, determining a work status of activities taking place on a site for which the test image was received, the site comprising one or more of a construction site, an industrial site, a warehouse site, a storage site, a commercial site or a residential site.

7. The image segmentation system of claim 6, storing additional program instructions for:

determining whether labels can be assigned to pixels of the resized patch comprises by applying a majority voting algorithm to labels assigned to pixels of the resized patch to determine the labels for all pixels of the resized patch.

8. The image segmentation system of claim 7, storing additional program instructions for:

receiving a plurality of training images of the site;

determining, based on the plurality of training images, the plurality of materials that is depicted in the plurality of training images;

creating, based on the plurality of training images, a plurality of sample images, each sample image depicting at least one material of the plurality of materials;

creating, based on the plurality of sample images, a plurality of multi-scale patches for the plurality of materials, each multi-scale patch for a material is created from a sample image of the material from the plurality of materials;

designing, using the one or more computing devices, the plurality of classifiers configured to analyze digital images having different sizes;

training the plurality of classifiers using the plurality of multi-scale patches as input and using the plurality of materials as output.

9. The image segmentation system of claim 8, wherein a training image, of the plurality of training images, is a rectangular image;

wherein the plurality of training images includes indoor and outdoor images;

wherein the test image, of a plurality of test images, is captured by a camera that is installed at a fixed location;

wherein the plurality of test images is used to determine work progress over time, to determine quality of the plurality of materials that are being installed, and to determine correctness of installations;

wherein a multi-scale patch, of the plurality of multi-scale patches, is a square image;

the plurality of materials comprising two or more of: concrete, steel, rebar, plastic, wood, asphalt, porcelain, brick, composite, plaster, gypsum, cement, ceramic, carpet, paint, stucco, mortar, stone, urbanite, wire ropes, wire cables, bamboo, sheath panels, plex panels, plywood, wallpaper, laminate, or veneer;

wherein the plurality of materials are used to build or install one or more of: buildings, framings, mezzanine floors, purlins, insulations, coating, house wraps, doors, electrical systems, plumbing systems, surface finishing, flooring, wall coverings, heating systems, ventilation systems, air conditioning systems, utility systems, storage systems, roofs, windows, stairs, hangars, storage facilities, warehouse facilities, or garages.

10. The image segmentation system of claim 9, wherein the plurality of classifiers includes a plurality of convoluted neural network classifiers; wherein the plurality of classifiers comprises classifiers that accept inputs having different pixel-based-sizes.

11. One or more non-transitory digital storage media storing one or more sequences of program instructions which, when executed using one or more processors, cause the one or more processors to perform:

using one or more computing devices, receiving a digital image comprising test image;

using the one or more computing devices, creating, based on the test image, a plurality of grid patches;

using the one or more computing devices, receiving a plurality of classifiers that have been trained to identify one or more materials of a plurality of materials;

for each patch of the plurality of grid patches, before each pixel of the patch, of the plurality of grid patches, is labeled with a label:

determining whether a pixel-based-size of the patch matches a pixel-based-size of a classifier of the plurality of classifiers;

in response to determining that the pixel-based-size of the patch does not match the pixel-based-size of the classifier in the plurality of classifiers, generating a resized patch by either downsizing or upsizing the patch, and replacing the patch with the resized patch in the plurality of grid patches;

applying the classifier or a different classifier, from the plurality of classifiers, to the patch to determine whether labels can be assigned to pixels of the patch;

in response to determining that one or more pixels of the patch do not have assigned labels, repeating resizing of the patch until all pixels of the patch have assigned labels;

using the one or more computing devices, generating, based on labels assigned to pixels of the plurality of grid patches, a grid of labels for the test image;

based on, at least in part, the grid of labels, generating a segmentation mask for the test image;

based on, at least in part, the segmentation mask, determining a set of materials, of the plurality of materials, that is depicted in the test image;

based on, at least in part, the set of materials that has been determined, determining a work status of activities taking place on a site for which the test image was received, the site comprising one or more of a construction site, an industrial site, a warehouse site, a storage site, a commercial site or a residential site.

12. The one or more non-transitory digital storage media of claim claim 11, storing additional program instructions for:

determining whether labels can be assigned to pixels of the resized patch comprises by applying a majority voting algorithm to labels assigned to pixels of the resized patch to determine the labels for all pixels of the resized patch.

13. The one or more non-transitory digital storage media of claim 12, storing additional program instructions for:

receiving a plurality of training images of the site;

determining, based on the plurality of training images, the plurality of materials that is depicted in the plurality of training images;

creating, based on the plurality of training images, a plurality of sample images, each sample image depicting at least one material of the plurality of materials;

creating, based on the plurality of sample images, a plurality of multi-scale patches for the plurality of materials, each multi-scale patch for a material is created from a sample image of the material from the plurality of materials;

designing, using the one or more computing devices, the plurality of classifiers configured to analyze digital images having different sizes;

training the plurality of classifiers using the plurality of multi-scale patches as input and using the plurality of materials as output.

14. The one or more non-transitory digital storage media of claim 13, wherein a training image, of the plurality of training images, is a rectangular image;

wherein the plurality of training images includes indoor and outdoor images;

wherein the test image, of a plurality of test images, is captured by a camera that is installed at a fixed location;

wherein the plurality of test images is used to determine work progress over time, to determine quality of the plurality of materials that are being installed, and to determine correctness of installations;

wherein a multi-scale patch, of the plurality of multi-scale patches, is a square image;

the plurality of materials comprising two or more of: concrete, steel, rebar, plastic, wood, asphalt, porcelain, brick, composite, plaster, gypsum, cement, ceramic, carpet, paint, stucco, mortar, stone, urbanite, wire ropes, wire cables, bamboo, sheath panels, plex panels, plywood, wallpaper, laminate, or veneer;

wherein the plurality of materials are used to build or install one or more of: buildings, framings, mezzanine floors, purlins, insulations, coating, house wraps, doors, electrical systems, plumbing systems, surface finishing, flooring, wall coverings, heating systems, ventilation systems, air conditioning systems, utility systems, storage systems, roofs, windows, stairs, hangars, storage facilities, warehouse facilities, or garages.

* * * * *